(12) United States Patent
Lisso et al.

(10) Patent No.: US 11,639,267 B2
(45) Date of Patent: *May 2, 2023

(54) SYSTEMS AND METHODS FOR WAREHOUSE ORDER SORTATION

(71) Applicant: Target Brands, Inc., Minneapolis, MN (US)

(72) Inventors: Gregory Lisso, Minneapolis, MN (US); David Sellner, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,832

(22) Filed: Nov. 23, 2021

(65) Prior Publication Data

US 2022/0081214 A1 Mar. 17, 2022

Related U.S. Application Data

(63) Continuation of application No. 16/913,891, filed on Jun. 26, 2020, now Pat. No. 11,192,720.

(60) Provisional application No. 62/887,270, filed on Aug. 15, 2019.

(51) Int. Cl.
*B65G 1/137* (2006.01)
*G06Q 50/28* (2012.01)

(52) U.S. Cl.
CPC .......... *B65G 1/1376* (2013.01); *G06Q 50/28* (2013.01)

(58) Field of Classification Search
CPC .............................. B65G 1/1376; G06Q 50/28
See application file for complete search history.

(56) References Cited

U.S. PATENT DOCUMENTS

| 7,979,359 | B1 | 7/2011 | Young et al. |
| 8,718,814 | B1 | 5/2014 | Clark et al. |
| 11,192,720 | B2 * | 12/2021 | Lisso ............... B65G 1/1376 |
| 2009/0234668 | A1 * | 9/2009 | Wheeler ........ G06Q 30/0281 |
| | | | 705/346 |

(Continued)

OTHER PUBLICATIONS

Berkshiregrey.com [online], "Real robots ready now to intelligently pick, pack, and sort the broadest assortment of your products," 2020, retrieved on Jun. 25, 2020, retrieved from URL <https://www.berkshiregrey.com/technologies/robotics/> 10 page.

(Continued)

*Primary Examiner* — Kyle O Logan
(74) *Attorney, Agent, or Firm* — Fish & Richardson P.C.

(57) ABSTRACT

Warehouse automation and methods of automatically sorting and sequencing items can be implemented to streamline and expedite order fulfillment and store replenishment processes in a cost-effective manner. Some embodiments described herein include sorting items to a truck-level, inducting items for a first truck into a first portion of a mobile robot field, accumulating the items in the first portion of the mobile robot field until all the items for a first cart of the first truck are in the first portion, moving, by one or more mobile robots, all of the items for the first cart in a sequence that corresponds to a store aisle layout, loading the first cart in the sequence, and moving the loaded first cart into the first truck, which can be accomplished in a particular sequence with other carts for the first truck.

20 Claims, 6 Drawing Sheets

(56) References Cited

U.S. PATENT DOCUMENTS

2011/0295764 A1* 12/2011 Cook ................ G06Q 30/02
                                                    705/348
2017/0344934 A1* 11/2017 Millhouse ............ G06Q 10/083
2017/0345085 A1* 11/2017 Hwang ................ G06Q 50/01

OTHER PUBLICATIONS

Raffaello.name [online], "Mobile-Robot-Enabled Smart Warehouses," Sep. 2013, retrieved on Jun. 25, 2020, retrieved from URL <https://raffaello.name/wp-content/uploads/2013/09/Kiva2_IoCT-Part2-17SmartWarehouses-HR,pdf>, 2 pages.

Theverge.com [online], "Welcome to the Automated Warehouse of the Future," May 8, 2018, retrieved on Jun. 25, 2020, retrieved from URL <https://www.theverge.com/2018/5/8/17331250/automated-warehouses-jobs-ocado-andover-amazon>.

Wired.com [online], "Inside the Amazon Warehouse Where Humans and Machines Become One," Jun. 5, 2019, retrieved on Jun. 25, 2020, retrieved from URL <https://www.wired.com/story/amazon-warehouse-robots/> 10 page.

Youtube.com [online], "Inside a Warehouse Where Thousands of Robots Pack Groceries," May 9, 2018, retrieved on Jun. 25, 2020, retrieved from URL <https://www.youtube.com/watch?v=4DKrcpa8Z_E>, 1 page.

Youtube.com [online], "Tompkins Robotics Presents t-Sort," Mar. 9, 2018, retrieved on Jun. 25, 2020, retrieved from URL <https://www.youtube.com/watch?v=EbLDXsEPHS8>, 1 page.

* cited by examiner

SYSTEMS AND METHODS FOR WAREHOUSE ORDER SORTATION

CROSS-REFERENCE TO RELATED APPLICATIONS

This application claims the benefit of U.S. application Ser. No. 16/913,891 filed on Jun. 26, 2020, which claims the benefit of U.S. Provisional Application Ser. No. 62/887,270 filed on Aug. 15, 2019. The disclosure of the prior applications are considered part of (and are incorporated by reference in) the disclosure of this application.

TECHNICAL FIELD

This document relates to systems and methods for enhancing efficiencies of order fulfillment processes. For example, this document relates to warehouse automation and methods of automatically sorting and sequencing items to streamline order fulfillment and store replenishment processes.

BACKGROUND

The order fulfillment process refers to all the steps that companies take from the moment they receive a customer order (which can include an order that is wholly or partly internal to the company, such as a store replenishment order) to the moment that the items are landed in customers' hands. Such steps can include, for example: the order is sent to the warehouse; order sortation (e.g., a worker goes into the warehouse, finds the items in the order, and picks the items off the shelf); the order is packed for shipping; and the order is shipped.

The use of warehouse automation is one way to increase the efficiency of an order fulfillment process. The goal of automation is to cut out manual steps of the order fulfillment process. Automation technology is useful for at least two reasons: to help reduce the occurrences of human error and to make processes more efficient. Two-day deliveries are currently standard, and customers are often willing to pay extra for same-day or next-day deliveries. Highly efficient warehousing, order sortation, and shipping processes are on the frontline of meeting this high level of customer expectations.

SUMMARY

This document describes systems and methods for enhancing efficiencies of order fulfillment processes. For example, this document describes warehouse automation and methods of automatically sorting and sequencing items to streamline and expedite order fulfillment and store replenishment processes in a cost-effective manner. For example, in some embodiments the systems and methods described herein include: (i) sorting items to a truck-level, (ii) inducting items for a first truck into a first portion of a mobile robot field, and (iii) accumulating the items in the first portion of the mobile robot field until all the items for a first cart (or other type of transport vessel, or other type of sub-set) of the first truck are in the first portion of the mobile robot field. Then, using one or more mobile robots, moving all of the items designated for the first cart in a sequence that corresponds to a store aisle layout. The items can be loaded manually (or in an automated manner) into particular locations in the first cart in correspondence with the sequence. Then, the loaded first cart can be moved into the first truck (which can be, at least in some embodiments, performed in a particular sequence with other carts for the first truck to make store replenishment efficient).

In one aspect, this disclosure is directed to an automated method for sorting saleable items into a store aisle-ready arrangement. In some embodiments, the method includes: (i) inducting a plurality of items into a first mobile robot field; (ii) assigning each of the items to a particular location of a particular store-friendly transport vessel, wherein the particular location assignments of the items are based on how the items will be arranged at a store to which the items are destined; (iii) determining whether all of the items assigned to a first store-friendly transport vessel are in the first mobile robot field; and (iv) in response to determining that all of the items assigned to the first store-friendly transport vessel are in the first mobile robot field, causing one or more mobile robots to transport, from the first mobile robot field to a station for loading by a robot or by a human operator the first store-friendly transport vessel, all of the items assigned to the first store-friendly transport vessel in a sequence that corresponds to the particular location assignments of the items.

Such a method may optionally include one or more of the following features. In some embodiments, the method also includes: assigning a plurality of store-friendly transport vessels to a particular semi-trailer; and determining a sequence for loading the plurality of store-friendly transport vessels into the particular semi-trailer based on how the plurality of items in the plurality of store-friendly transport vessels will be arranged at a store to which the items are destined. In particular embodiments, the method also includes determining a sequence for inducting the plurality of items into the first mobile robot field based on the particular location assignments of the items in the particular store-friendly transport vessel and the sequence for loading the plurality of store-friendly transport vessels into the particular semi-trailer. The first mobile robot field may comprise two or more portions. A mobile robot may be assigned to a particular portion of the first mobile robot field. The plurality of items may be inducted into the first mobile robot field by a conveyor of the warehouse that is reconfigured to feed into a particular portion of the first mobile robot field. In some embodiments, all of the items assigned to the first store-friendly transport vessel are located in a first portion of the first mobile robot field and all of the items assigned to a second store-friendly transport vessel are located in a second portion of the first mobile robot field that differs from the first portion of the first mobile robot field. The method may also include: determining whether all of the items assigned to a second store-friendly transport vessel are in the first mobile robot field; and/or in response to determining that all of the items assigned to the second store-friendly transport vessel are in the first mobile robot field, causing one or more mobile robots to transport, from the first mobile robot field to a station for loading by a robot or by a human operator the second store-friendly transport vessel, all of the items assigned to the second store-friendly transport vessel in a sequence that corresponds to the particular location assignments of the items. In some embodiments, the sequence that corresponds to the particular location assignments of the items further corresponds to an order that one or more shelves in a store aisle will be stocked. The sequence may correspond to the particular location assignments of the items and may further correspond to at least one of a direction from left to right and a direction from right to left that the one or more shelves in the store aisle will be stocked. In some embodiments, the warehouse comprises one or more multi-level mobile robot fields. Causing one or more mobile robots to transport all of the items assigned to the first store-friendly transport vessel in a sequence that corresponds to the particular location assignments of the items may further comprise transporting all of the items assigned to the first store-friendly transport vessel from the one or more multi-level mobile robot fields to the station for loading. In some embodiments, the method also includes one or more of: (a) inducting the plurality of items into a second multi-level mobile robot field; (b) determining whether all of the items assigned to the first store-friendly transport vessel are in the second elevated multi-level robot field; and (c) in response to determining that all of the items assigned to the first store-friendly transport vessel are in the second multi-level mobile robot field, causing one or more mobile robots to transport, from the second multi-level mobile robot field to a spiral conveyor, all of the items assigned to the first store-friendly transport vessel in a sequence that corresponds to the particular location assignments of the items.

In another aspect, this disclosure is directed to a system for sorting saleable items into a store aisle-ready arrangement. The system includes: a first mobile robot field; a conveyor of a warehouse that is configured to feed items into the first mobile robot field; one or more mobile robots configured to perform tasks in the first mobile robot field; and a control system. In some embodiments, the control system is configured to: induct a plurality of items into the first mobile robot field; assign each of the items to a particular location of a particular store-friendly transport vessel, wherein the particular location assignments of the items are based on how the items will be arranged at a store to which the items are destined; determine whether all of the items assigned to a first store-friendly transport vessel are in the first mobile robot field; and in response to determining that all of the items assigned to the first store-friendly transport vessel are in the first mobile robot field, causing one or more mobile robots to transport from the first mobile robot field to a station for loading by a robot or by a human operator the first store-friendly transport vessel, all of the items assigned to the first store-friendly transport vessel in a sequence that corresponds to the particular location assignments of the items.

Such a system may optionally include one or more of the following features. The first mobile robot field may comprise two or more portions. In some embodiments, a mobile robot is assigned to a particular portion of the first mobile robot field. The first mobile robot field may be a multilevel robot field.

In another aspect, this disclosure is directed to an automated method for sorting saleable items into a store aisle-ready arrangement. In some embodiments, the method includes: (a) assigning a plurality of store-friendly transport vessels to a particular semi-trailer; (b) determining a sequence for loading the plurality of store-friendly transport vessels into the particular semi-trailer based on assigning each of a plurality of items to a particular location of a particular store-friendly transport vessel, wherein the particular location assignments of the items are based on how the items will be arranged at the store to which the items are destined; (c) inducting the plurality of items into a first mobile robot field based on the particular location assignments of the items in the particular store-friendly transport vehicle and the sequence for loading the plurality of store-friendly vessels into the particular semi-trailer; (d) determining whether all of the items assigned to a first store-friendly transport vessel to be loaded into the particular semi-trailer are in the first mobile robot field; (e) in response to determining that all of the items assigned to the first store-friendly transport vessel to be loaded into the particular semi-trailer are in the first mobile robot field, causing one or more mobile robots to transport, from the first mobile robot field to a station for loading by a robot or by a human operator the first store-friendly transport vessel, all of the items assigned to the first store-friendly transport vessel in the sequence that corresponds to the particular location assignments of the items; and (f) in response to determining that all of the items assigned to the first store-friendly transport vessel are loaded into the first store-friendly transport vessel in the sequence that corresponds to the particular location assignments of the items, loading the first store-friendly transport vessel into the particular semi-trailer based on the sequence for loading the plurality of store-friendly transport vessels into the particular semi-trailer.

Such a method may optionally include one or more of the following features. In some embodiments, each of the plurality of store-friendly transport vessels corresponds to an aisle in the store. The sequence for loading the plurality of store-friendly transport vessels into the particular semi-trailer may further correspond to an order that each aisle in the store will be stocked.

The systems, methods, and processes described herein may be used to provide one or more of the following optional benefits. First, some embodiments provide an order fulfillment process that is more responsive and agile so that orders can be shipped to internal and external customers in a shorter timeframe than current processes. In particular, the automated systems, methods, and processes described herein add the potential for using a substantial granularity of order sortation processes in comparison to conventional warehouse sorting systems, methods, and processes for outbound shipments. Adding the granular sorts can reduce delays and interferences in the warehouse, and/or in processes downstream of the warehouse (e.g., store replenishment processes, and the like).

Second, some embodiments allow multiple types of orders to be processed and fulfilled using the same (or essentially the same) order fulfillment process. For example, direct-to-customer shipments, store replenishment orders, customer pick-up-at-store orders, forward deployment of inventory shipments, inventory transfers, and the like can be advantageously processed and fulfilled using essentially the same systems, methods, and processes described herein. In particular, adding more granular sorts can increase the warehouse's capability to sequence items for efficient store replenishment or other types of orders to be processed and fulfilled.

Third, the accuracy of order fulfillment processes can be enhanced by eliminating human errors by using the automated systems, methods, and processes described herein. For example, robots can be configured to accurately transport items that are inducted into the mobile robot field described herein to designated loading stations, trucks, or other locations or assets in the warehouse. The items can be inducted from multiple points into particular portions of the mobile robot field. This can reduce labor costs associated with the order fulfillment processes. This can further increase efficiency of the warehouse as well as efficiency of the robots. As a result, fewer robots may be needed to transport items from the mobile robot field to designated locations in the warehouse.

Fourth, warehouse space requirements can be reduced by using the automated systems, methods, and processes described herein. For example, implementing and using the mobile robot field for order sortation and sequencing, as described herein, can be accomplished with minimal interruptions to warehouse operations and/or downtime in outbound shipments. This is especially true since existing assets and/or systems in the warehouse, such as sort lanes, conveyors, and first truck-level sort systems, can be repurposed to feed into the mobile robot field as described herein.

Fifth, the systems, methods and processes described herein can advantageously improve and/or un-constrain upstream picking processes that are performed using a wave picking methodology. Warehouse orders are often released/processed in waves over time periods of hours, shifts, days, or volume and/or other constrained windows. The systems, methods and processes described herein enable improvements in the context of the overlap of pick waves, and can accommodate downstream accumulation, processing and sorting of inventory. Such improvements can provide picking enhancements in terms of productivity and density of order pick containers (order picker cages, pallets, carts, etc.).

Other features, aspects, and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes the daily replenishment and movement of inventory generated from real-time demand singles for in-store retail sales and/or direct-to-guest on-line sales fulfilled from a multi-echelon inventory-holding model at the correct unit of measure, using fast and easy material handling equipment that will create operational efficiency at every process step in the supply chain. Said another way, this document describes warehouse automation and methods of controlling material flow to streamline and to consolidate different types of order fulfillment processes (which can include, for example, orders for direct shipments to consumers, orders that are wholly or partly internal to the company such as a store replenishment orders, and/or other like order fulfillment processes).

Figure 1:
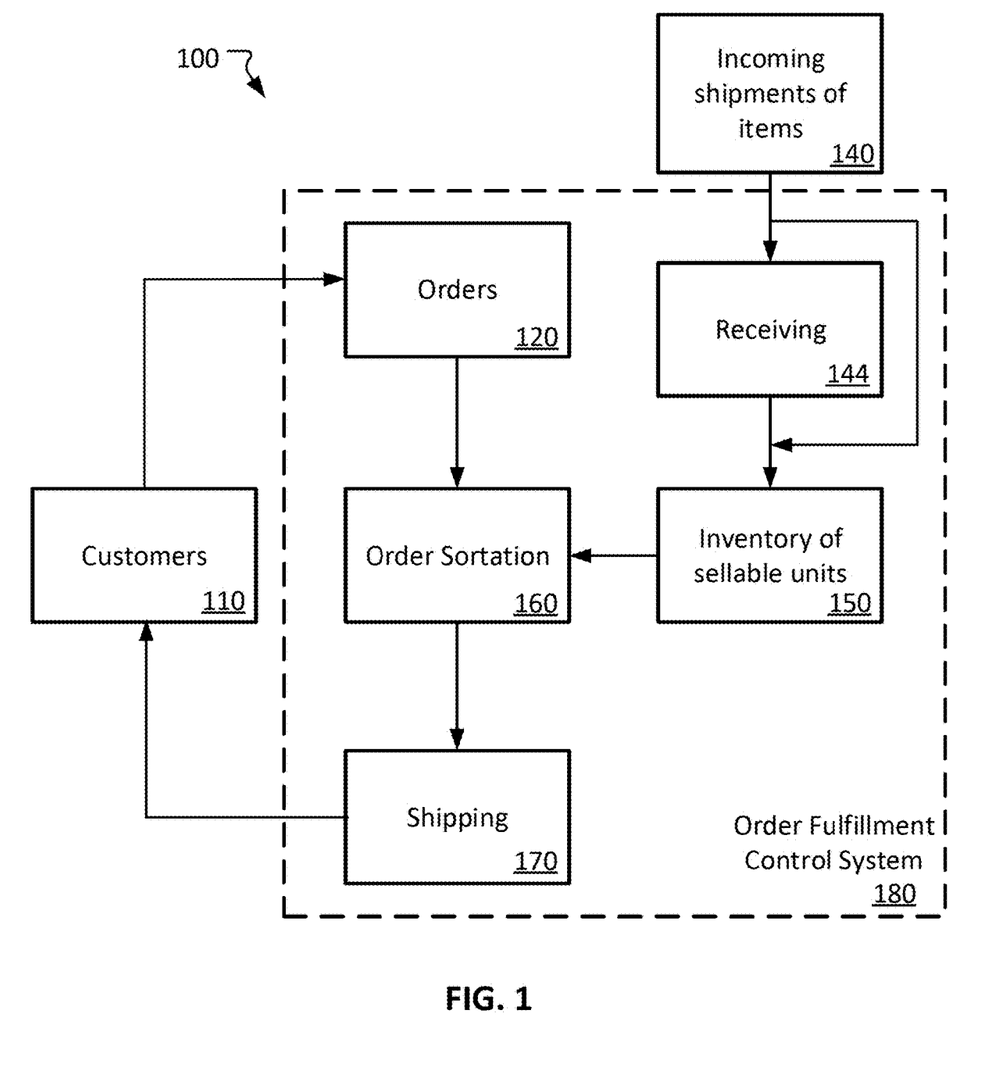
FIG. 1 is a highly-simplified schematic diagram of a basic order fulfillment process.

FIG. 1 depicts an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" (or simply "warehouse") may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations or transport vessels, such as racks, shelves, containers, vessels, carts, bins, totes, pallet lanes, and the like. Such storage accommodations or transport vessels can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order sortation 160, the sellable item(s) included in the customer order 120 are compiled in preparation for shipment to the respective customer 110. To fulfill the customer orders 120, the one or more items specified in each order may be retrieved, or picked, from inventory 150. Picked sellable items may be delivered or conveyed to one or more areas in the flow center for sorting and assembling into one or more outbound shipping containers for the fulfillment of a respective customer order 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in the following figures, order sortation systems and methods will be described.

Figure 2:
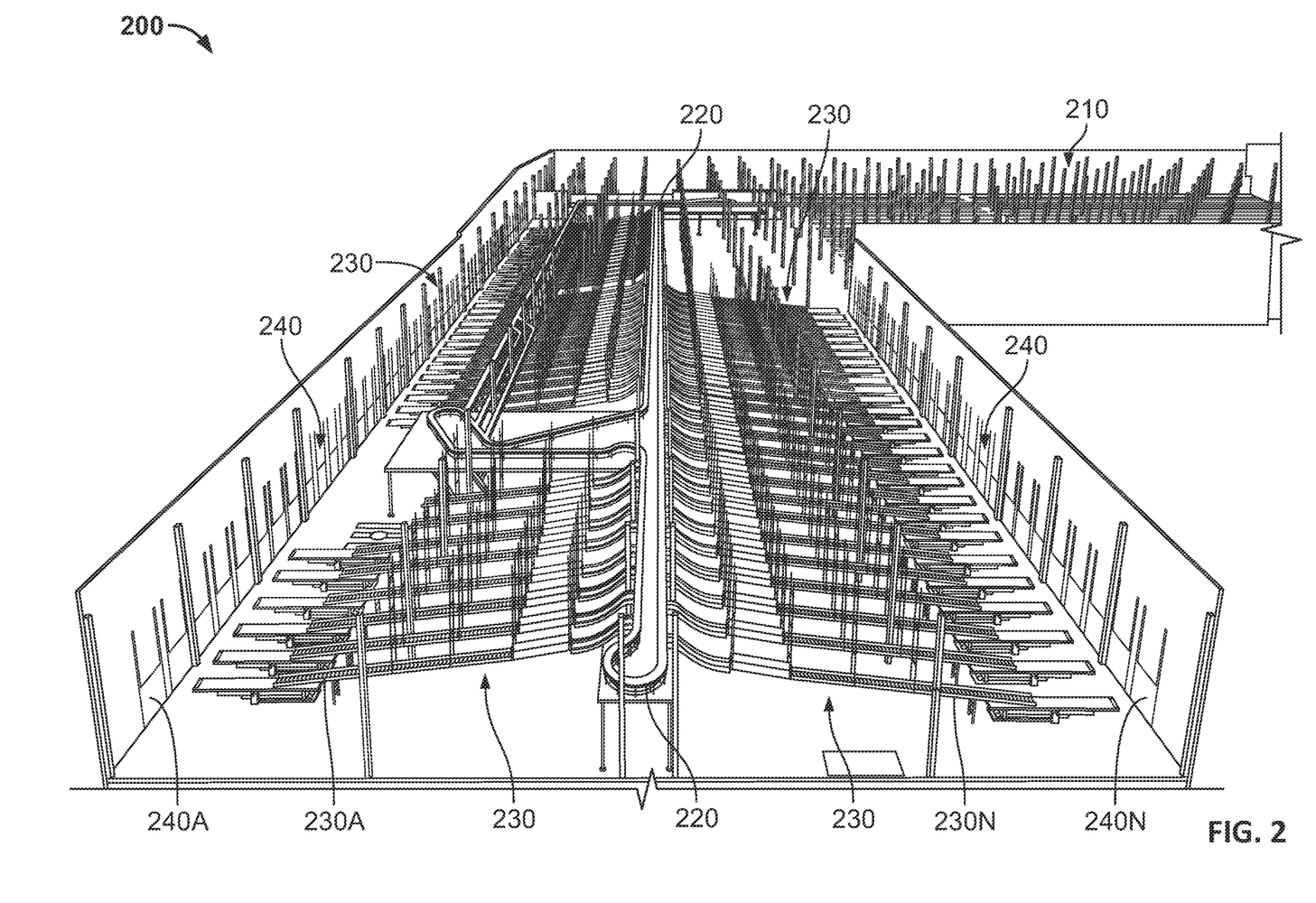
FIG. 2 depicts an example truck-level order sortation system in accordance with some embodiments.

FIG. 2 depicts an example truck-level order sortation system 200 in accordance with some embodiments described herein. While not specifically depicted in FIG. 2, it should be understood that the operations of the order sortation system 200 involve the use of an order fulfillment control system (such as a warehouse management system, one or more computerized automation/robotic control systems, and/or other such systems that can communicate and coordinate control activities between each other and across the overall order sortation system 200). Such an order fulfillment control system can be situated locally, remotely situated, or both locally situated and remotely.

From an overview standpoint, the order sortation system 200 includes one or more inventory storage areas 210. The storage area(s) 210 can be any location in the warehouse where items that are ready to be dispatched to trucks (e.g., semi-trailers) for delivery to stores or other customers are temporarily stored. The storage area(s) 210 can include various types of storage accommodations or transport vessels as previously discussed in FIG. 1, such as racks, shelves, containers, vessels, carts, bins, totes, pallet lanes, and the like to temporarily store the boxes or other items.

When an item (e.g., box) is called for to be transported to a designated truck for outbound shipment, the item can be manually or automatically loaded onto a conveyor 220, or other type of item transportation system/technique. In some embodiments, the conveyor 220 can be elevated to a particular height above the floor of the warehouse to allow for unobstructed movement of human workers and warehouse vehicles, such as forklifts, below the conveyor 220. In other embodiments, the conveyor 220 can be placed on the floor of the warehouse rather than elevated. In the preferred embodiment, the conveyor 220 is in its existing, prior configuration in the warehouse. Keeping the existing conveyor 220, rather than purchasing a new conveyor, is advantageous to reduce costs, increase efficiency, and avoid downtime when reconfiguring the existing warehouse system and its assets, such as the conveyor 220, to the improved system described throughout in the following description.

The conveyor 220 can be generally horizontal but can also have inclines, declines, and/or tilt depending on the existing configuration of the conveyor 220 and needs of the warehouse facility. In some embodiments, the conveyor 220 (or mechanisms associated therewith) can be configured to direct and/or push items off in one or more directions using known processes. In some embodiments, the conveyor 220 continues down essentially an entire length of the warehouse or order sortation system 200, such that the conveyor 220 has access to each sorting lane in the warehouse. In particular embodiments, the conveyor 220 continues down a certain length that is not the entire length of the system 200. The conveyor 220 can also be configured in any other way that is advantageous to meet the needs of the warehouse and the warehouse's customers. The conveyor 220 can further have different widths depending on the types of items it transports. In other embodiments, the conveyor 220 can have a vacuum, suction-type feature and/or a textured belt that holds a product on the surface of the belt whenever there are changes in elevation and/or speed of the conveyor 220. Other types of conveyor configurations known in the field can be implemented in the order sortation system 200 depicted in FIG. 2.

In the example embodiment of FIG. 2, the conveyor 220 is elevated above the floor of the warehouse and has multiple connection and/or access points that disperse items to one or more sorting lanes 230 (such as the exemplary sorting lanes 230A and 230N which are representative of the extensive number of sorting lanes 230). Each sorting lane 230 ends near a designated and/or associated truck loading zone 240 where an assigned or associated truck (e.g., semi-trailer) is located and waiting to be loaded. For example, in this embodiment, sorting lane 230A receives items from the conveyor 220 that are intended to ship out on a truck stationed at the truck loading zone 240A. Therefore, only items assigned to the truck in the truck loading zone 240A are inducted/transferred from the conveyor 220 onto the sorting lane 230A, to then be moved into the truck/trailer at the truck loading zone 240A.

In the embodiment of FIG. 2, there is generally no particular order or sequence that items are inducted onto sorting lanes 230 or packed into the trucks at the truck loading zones 240. In other words, there is generally no item-level sequencing because items are not being inducted onto the sorting lanes 230 in a particular order (e.g., a sequence corresponding to how the items will be unpacked, such as corresponding to a store aisle layout in the case of an aisle-ready shipment).

Although not depicted in FIG. 2, in some embodiments, one or more of the sorting lanes 230 can be replaced by one or more conveyors that end at the truck loading zones 240. As a result, the main conveyor 220 can induct items onto other conveyors that branch off it (as depicted). In yet other embodiments, there may be a system of conveyors rather than just the single main conveyor 220. Items can be transported through the system of conveyors before being inducted onto a sorting lane associated with a truck loading zone. The system of conveyors may be advantageous in a warehouse facility that is larger in scale, has a multitude of truck loading areas, and/or is not L-shaped.

In some embodiments, the sorting lanes 230 can end at loading stations (e.g., workstations), wherein each loading station is associated with a particular truck loading zone 240. One or more human workers can be assigned to a particular loading station and tasked with moving items that come off the associated sorting lane 230 into one or more carts or other type of transport vessel (e.g., as previously discussed in reference to FIG. 1), and load the carts/vessels into a truck/trailer at the associated truck loading zone 240. In other embodiments, a robot can be assigned to a particular loading station to carry out the tasks that the human operator(s) would perform.

The systems and methods described below in reference to FIGS. 3-6 provide several enhancements to the truck-level order sortation system 200.

Figure 3:
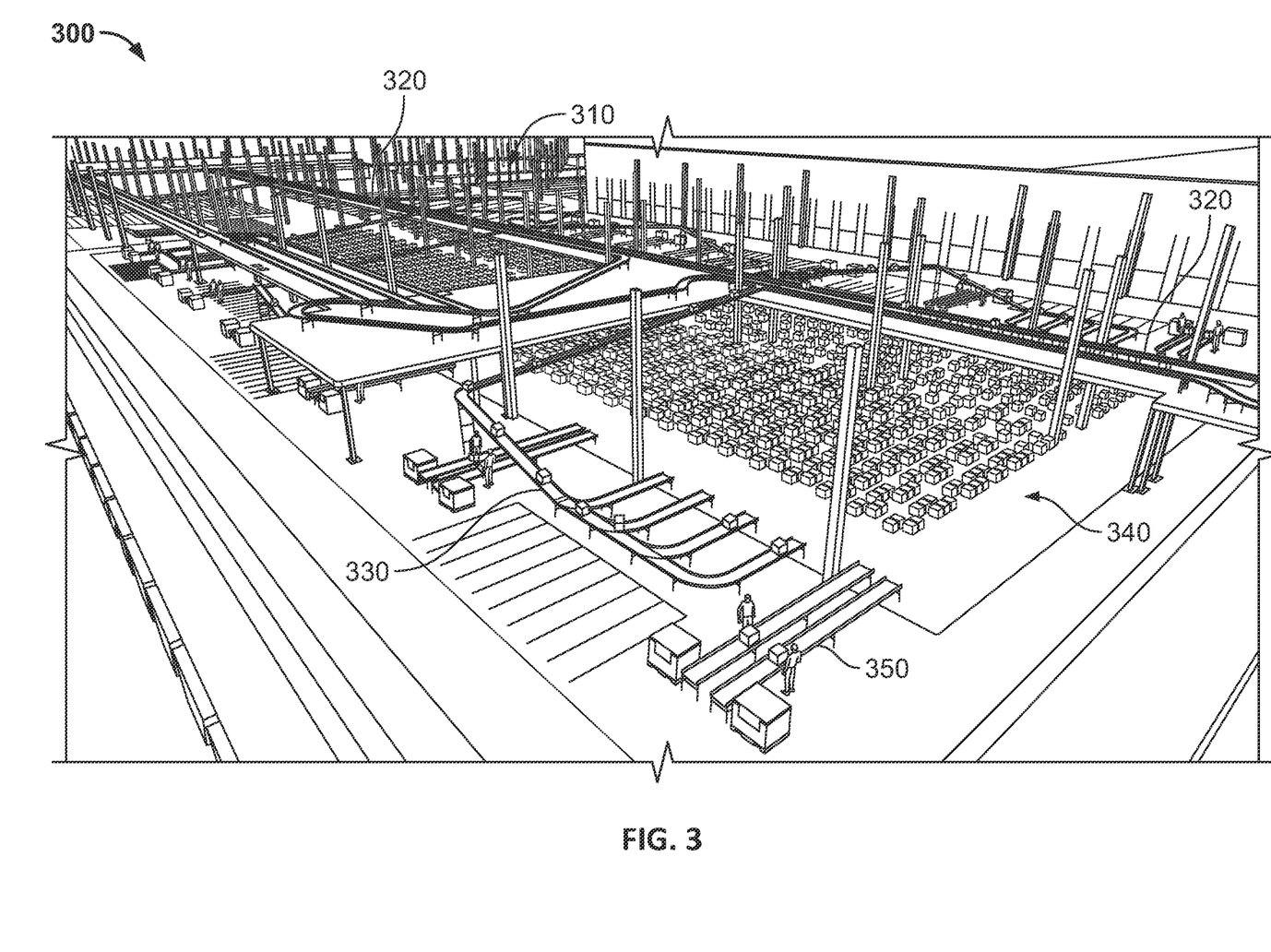
FIG. 3 depicts an example store replenishment cart level order sortation and sequencing system in accordance with some embodiments.

FIG. 3 depicts an example store replenishment cart level order sortation and sequencing system 300 (or simply "system 300"). In other words, the system 300 is operable for sorting/sequencing items to the granularity necessary for loading a store replenishment cart (or other type of transport vessel) in a particular arrangement that coincides with a layout of a store aisle or aisles. Such an item-carrying cart can therefore be referred to as an aisle-ready cart, because the cart is loaded with items in a particular arrangement that simplifies store shelf replenishment, making for a highly efficient store shelf replenishment process.

Similar to the truck-level order sortation system 200 depicted in FIG. 2, this system 300 includes a storage area 310 where items are temporarily stored until they are ready for shipment and moved onto a main conveyor 320. The conveyor 320 is shown elevated in its preexisting configuration. The conveyor 320 transports items as previously described in FIG. 2. A sorting lane 330 branches off the main conveyor 320 and feeds into a mobile robot field 340. One or more mobile robots can be configured to perform tasks in the mobile robot field 340.

Similar to FIG. 2, the system 300 can include a multitude of sorting lanes (such as a sorting lane 330) that branch off the main conveyor 320. In the depicted embodiment, the sorting lane 330 may have initially fed into a particular truck loading zone (e.g., as described in reference to FIG. 2), but in the system 300 the sorting lane 330 is repurposed or reconfigured to feed into a mobile robot field 340. In other embodiments, the conveyor 320 can be reconfigured (e.g., repurposed) to feed into the mobile robot field 340 and/or a particular portion of the mobile robot field 340.

The system 300 is advantageous because existing warehouse assets (e.g., sorting lanes, conveyors, etc. as depicted in FIG. 2) can be repurposed or reconfigured, which decreases the costs of implementing the system 300, increases efficiency, and ensures that there is essentially no downtime or interruptions to the operations of the warehouse. Repurposing existing assets may be less expensive than buying and installing new assets to accommodate for the mobile robot field 340. With the resources saved by repurposing existing assets, the warehouse facility can choose to purchase or add additional robots to the mobile robot field 340 or throughout the warehouse facility.

Moreover, some warehouse assets can be repurposed in batches, such that some sorting lanes continue to feed into particular pre-existing truck loading zones (e.g., as depicted in FIG. 2) while some sorting lanes are repurposed to feed into the mobile robot field 340 (e.g., as depicted in FIG. 3). Consequently, the warehouse can, temporarily or on a long-term basis, have a hybrid system in which some sorting lanes feed into particular truck loading zones and some sorting lanes feed into the mobile robot field 340. This can be an advantageous scenarios because it ensures the warehouse does not experience downtime while repurposing the existing assets. Maintaining the warehouse with this hybrid layout may also be beneficial to fulfill the needs of the warehouse's customers. For example, to adequately ship items to a larger store, the most efficient warehouse layout may include one or more sorting lanes that feed directly into one or more truck loading zones associated with the larger store. Then, the remaining sorting lanes in the warehouse can feed into the mobile robot field 340 such that items associated with smaller stores and/or other customers are fed into the mobile robot field 340 and then transported to loading stations. Various other warehouse layouts can be implemented depending on the particular needs of the warehouse and/or the warehouse's customers.

Still referring to FIG. 3, items are transferred from conveyor 320 to particular sorting lanes in correspondence with the truck/trailer in which they are to be shipped. Once an item arrives at the end of a sorting lane (e.g., the example sorting lane 330 which is located adjacent to a particular partial portion of the mobile robot field 340), in some embodiments a mobile robot from the mobile robot field 340 can automatically pick up the item from the sorting lane 330 and move it to a location in the particular portion of the mobile robot field 340 for temporary storage. In some embodiments, each mobile robot can be assigned to operate (e.g., pick up and transport items) within a particular partial portion of the mobile robot field 340. Alternatively, in some embodiments the mobile robots can move and operate within the entirety of the mobile robot field 340. In some embodiments, an order fulfillment control system (e.g., as discussed in reference to FIG. 1) in conjunction with a fleet management system can control the movements and operations of each mobile robot in the mobile robot field 340.

Additional items that are intended for shipment via a particular truck/trailer are continued to be transferred onto the conveyor 320 and then to the corresponding sorting lane, such as the sorting lane 330. Once all items for a particular aisle-ready cart (or other sub-set of items) are located in the mobile robot field 340, one or more mobile robots can then transport the individual types of items for the particular aisle-ready cart to a loading station 350 (e.g., workstation). The one or more mobile robots will transport the items to the loading station 350 in a particular sequence (e.g., order). The particular sequence corresponds with how the aisle-ready cart is to be loaded (e.g., starting with the top shelf of the cart and then downward to subsequently lower shelves, or any suitable manner), which in turn corresponds with the layout of the store shelves that the aisle-ready cart will be used for (when the aisle-ready cart is taken into the store to replenish the store shelves).

At the loading station 350, a human worker (or a robot) can readily load the items into the particular cart in the correct sequence and/or location in the cart because the items are delivered to the loading station 350 in the correct sequence. As a result, human error in appropriately loading the aisle-ready cart can be reduced, if not, removed altogether. Once the cart is filled as intended, it can be transported by a human operator or mobile robot to the particular truck/trailer it is designated.

As previously mentioned, more than one sorting lane 350 can feed into the mobile robot field 340. As more lanes feed into the mobile robot field 340, items can be sorted to multiple trucks through more granular downstream sorts and sequencing. In the exemplary system 300, no single sorting lane is assigned to a particular truck. Rather, all the sorting lanes induct items that are associated with different trucks into the mobile robot field 340. When many sorting lanes feed into the mobile robot field 340, items can be evenly distributed in the mobile robot field 340 such that robot efficiency also increases.

For example, an item that is dropped off near a particular portion of the mobile robot field 340 can be picked up and moved within that particular portion by a mobile robot that is currently closest to the item and/or assigned to that particular portion of the mobile robot field 340. Therefore, in such a case a mobile robot would not have to traverse (e.g., move through, navigate) large areas of the mobile robot field 340 to pick up and move an item inducted into the mobile robot field 340 from one of the sorting lanes. Instead, if all the mobile robots are assigned to work in designated, partial portions of the mobile robot field 340, then robot efficiency can increase and less time would be required to transport items around the mobile robot field 340, and to the loading stations 350. Assigning mobile robots to particular portions in the mobile robot field 340 can also reduce the risk of collision, traffic jams, or any other similar delays in warehouse efficiency. Moreover, this can lead to the use of fewer robots in the warehouse, which has the added benefit of decreasing costs of operation.

Whereas existing systems may provide truck-centric sorting (e.g., refer to FIG. 2), the system 300 has cart-centric sorting (or other types of item sub-sets), which allows for more granular downstream sorts in any type of sorting system. Repurposing existing sorting lanes to feed into the mobile robot field 340 can increase efficiency by adding the capability to perform additional sorting and sequencing processes to the overall system 300. The mobile robot field 340 can increase the number of sorts and/or sequencing performed, which can in turn lead to filling up more trucks with carts and further ensuring the items on each cart and the carts in each truck are sequenced appropriately to meet the downstream customer's needs (e.g., in any particular store aisle layout arrangement).

Sequencing is possible in the system 300 because the mobile robot field 340 creates an item storage buffer. In other words, items for a particular cart associated with a truck are temporarily stored in the mobile robot field 340 until all the items for the particular cart are located in the mobile robot field 340. Once all the items for the particular cart are in the mobile robot field 340, those items can be sequenced by the order fulfillment control system (e.g., refer to FIG. 1). Then, a fleet management system in communication with the order fulfillment system can control one or more mobile robots in the mobile robot field 340 to transport the items in the correct sequence to the loading station 350 to then be loaded into the particular, associated aisle-ready cart. The items in the particular cart can be sequenced to correspond to a store aisle layout, as discussed in more detail below.

The aisle-ready carts (or storage-friendly transport vessels) can include any type of device, such as a cart, bin, or multiple bins on a cart, which has wheels, no wheels, or is transportable around a facility by other means. For example, where the aisle-ready transport vessel has wheels, such as a cart, it can be wheeled into a store, and more specifically, wheeled into a particular aisle in the store where items that were sorted and sequenced into the aisle-ready cart can now be conveniently stocked in the particular aisle/shelves.

Figure 4:
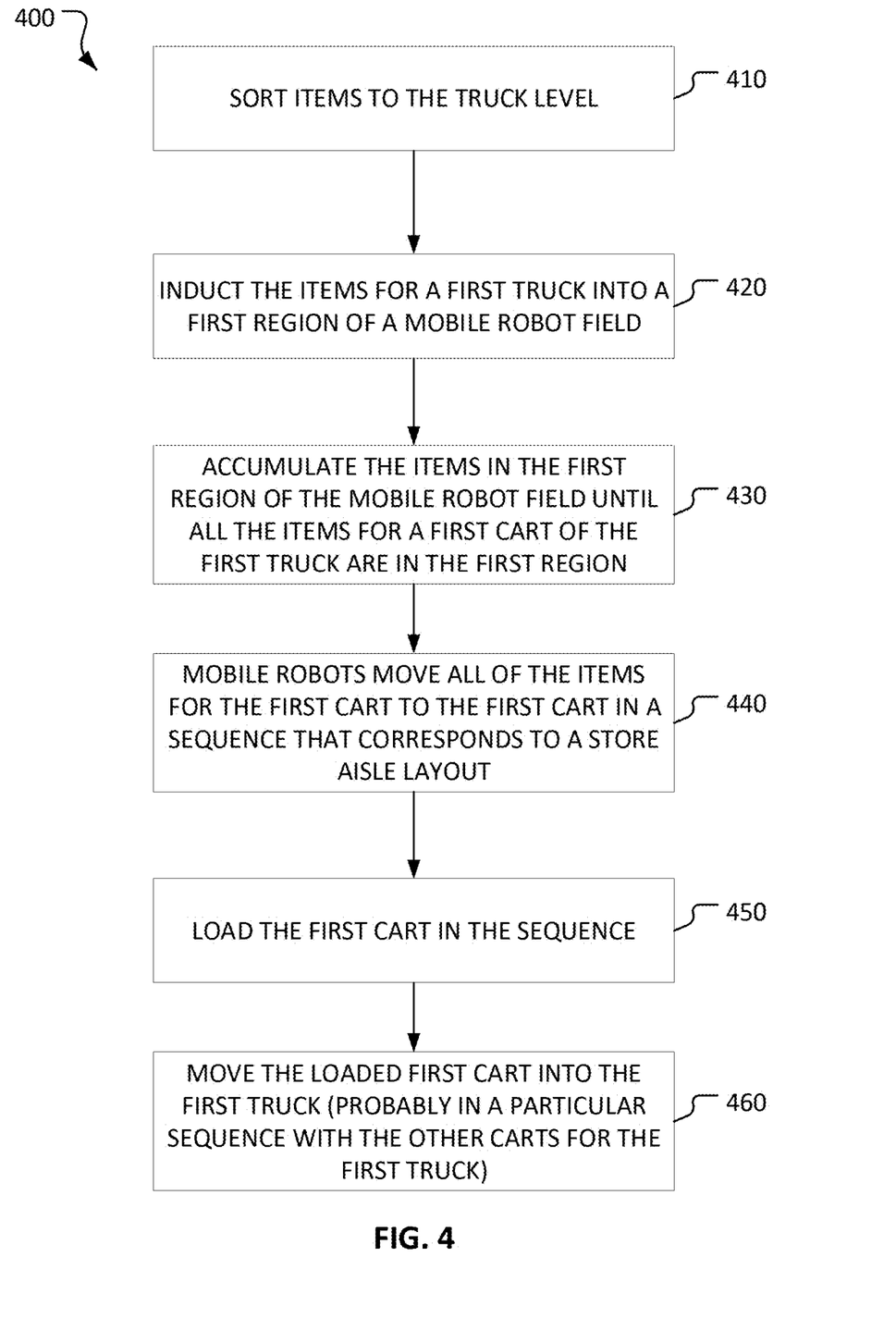
FIG. 4 is a flowchart of an example store replenishment cart level order sortation and sequencing system in accordance with some embodiments.

FIG. 4 is a flowchart of an example store replenishment cart level order sortation and sequencing process 400 in accordance with some embodiments. In some embodiments, the process 400 can be implemented using the system 300 described in reference to FIG. 3.

First, in step 410, a plurality of items (e.g., boxes, totes, etc.) are sorted to a truck-level. In some embodiments (such as described above in reference to FIG. 3), when the items are sorted to the truck-level they are inducted onto a main conveyor which has multiple sorting lanes branching off, from where the items are inducted into a mobile robot field. Sorting to the truck-level can include assigning each of the items to a particular location of a particular cart (e.g., store-friendly transport vessel), wherein the particular location assignments of the items are based on how the items will be arranged at a store to which the items are destined. Sorting to the truck-level can further include determining, by the order fulfillment control system described throughout this disclosure, which particular portion of the mobile robot field all items for a particular truck (e.g., semi-trailer) should be sent to. For example, all items for a first truck/trailer can be sorted and inducted from the main conveyor onto a first sorting lane that feeds into a first portion of the mobile robot field. Whereas all items for a second truck/trailer can be sorted and inducted from the main conveyor onto a second sorting lane that feeds into a second portion of the mobile robot field.

In some embodiments, multiple sorting lanes can feed into a single portion of the mobile robot field. Therefore, for example, all items for a first truck can be sorted and inducted from the main conveyor onto a first sorting lane or a second sorting lane that both feed into a first portion of the mobile robot field. Regardless of which sorting lane the items are inducted into, the items will still be inducted into the first portion of the mobile robot field that is associated with the first truck in this example. In some embodiments, no such portions of the mobile robot field are designated.

Next, in step 420 (and as described above), items are inducted for the first truck into the first portion of the mobile robot field. Here, the items for the first truck pass from the main conveyor to one or more sorting lanes that transport items to a location adjacent the first portion of the mobile robot field, from where they are picked up by one or more mobile robots and moved into the mobile robot field for temporary storage. The mobile robot field can be divided into one or more portions, wherein each portion includes at least one robot that is assigned to move items around that portion and/or to loading stations surrounding the mobile robot field. In some embodiments, each portion of the mobile robot field can be associated with a particular truck and/or a particular store or other customer. In other embodiments, a particular portion of the mobile robot field can receive items that go to a multitude of trucks, stores, and/or other customers. The preferred arrangement and association of portions in the mobile robot field can be determined based on the particular needs of each implementing warehouse facility.

Still referring to FIG. 4, in step 430 the items associated with the first truck are accumulated in the first portion of the mobile robot field until at least all of the items for a first cart of the first truck/trailer are located in the mobile robot field. Then a more granular sort can be made to occur using the mobile robots.

In the example of FIG. 4, once the control system described throughout this disclosure determines that all the items assigned to the first cart (e.g., store-friendly transport vessel) are located in the first portion of the mobile robot field, those items can be sorted and sequenced for the first cart. In some embodiments, each cart can be destined for a store aisle (or a portion thereof). In other embodiments, each cart can represent one or more individual customer orders.

In step 440, one or more mobile robots can be controlled to move or transport, from the mobile robot field to a station for loading the first aisle-ready cart (or other type of item sub-set), all of the items assigned to the cart in a sequence that corresponds to the particular location assignments of the items on the cart. In some embodiments, as previously discussed, a robot and/or a human operator can load all of the items into the cart at the loading station in the correct sequence (and location on the cart). Likewise, the control system described throughout this disclosure can determine whether all of the items assigned to a second cart are in the mobile robot field and, in response to determining that all of the items assigned to the second cart are in the mobile robot field, cause one or more mobile robots to transport, from the mobile robot field to a station for loading the second cart, all of the items assigned to the second cart in a sequence that corresponds to the particular location assignments of the items in the second cart.

The control system(s) can determine the correct item sequence and instruct/control each of the mobile robots to transport the items in accordance with that sequence. The sequence that corresponds to the particular location assignments of the items in a cart can correspond to an arrangement that one or more shelves in a store aisle or aisles will be stocked. Any desired methodology for arranging items on the cart for efficient store shelf replenishment can be used. In one example, a cart can be loaded in such a way that a bottom layer of items in the cart are associated with a bottom shelf in a first aisle in the store. A top layer of items in the cart can be associated with a top shelf in the first aisle in the store. Again, the method 400 can accommodate any desired methodology. Moreover, the sequence that corresponds to the particular location assignments of the items can further correspond to a direction from left to right or a direction from right to left that the one or more shelves in the store aisle will be stocked. This sequencing can be made to match unloading of the items in the store aisle for efficient store replenishment.

In some embodiments, the mobile robots can transport the items directly to the first cart. In other embodiments, the mobile robots can move the items for the first cart in the correct sequence to a loading station as previously described. Once the items are received in the correct sequence at the loading station associated with the first truck, a human operator can load the first cart in the correct sequence in step 450. Alternatively, instead of the human operator, a robot can be configured to load the first cart in the correct sequence at the loading station in step 450.

Finally, in step 460, the loaded first cart can be moved onto the first truck (e.g., particular semi-trailer). In some cases, the loaded first cart can be moved by the human operator who loaded the first cart. In other examples, the loaded first cart can be moved onto the first truck by one or more mobile robots. In yet other embodiments, the loaded first cart can be placed on a conveyor or other mechanism that automatically transports the cart into the first truck/trailer.

In some embodiments, the control system previously described can determine an appropriate loading sequence for all carts that will be moved into the first truck/trailer. Such a loading sequence can be determined based on a store layout, a store aisle layout, or any other delivery information associated with customer orders and/or shipment (refer to FIG. 5). For example, the control system can determine that carts 1 through 10 are associated with aisles 1 through 10 in a store and that the carts 1 through 10 will be unloaded in the store in that order. As a result, in one example the carts can be loaded into the first truck/trailer in the reverse order (e.g., 10-1) such that the first cart is the first to be off the truck/trailer and unloaded in aisle 1 in the store. In some embodiments, the control system can first determine a sequence of carts in the first truck/trailer. The system can then determine an order that all the items associated with the first truck/trailer should be sorted and sequenced in the mobile robot field and loaded into their respective carts.

For example, if the system determines that a tenth cart should be the last cart loaded into the truck because it will be the last cart unloaded in the store, then the system can determine that the tenth cart should be the first cart loaded with items in the warehouse. Consequently, items associated with the first truck that are to be sorted and sequenced into the tenth cart can be the first cart sorted and sequenced in the mobile robot field. This way, carts can be loaded in an efficient manner and carts will not be fully loaded or temporarily taking up space in the warehouse as carts that need to be loaded onto the truck first are being loaded with items or not yet loaded with items.

Once the order fulfillment control system determines an appropriate sequence for all the carts in the first truck, the one or more mobile robots and/or human operator(s) can be notified and instructed about how and when to load all of the carts into the first truck/trailer. It is important to note that the steps depicted in FIG. 4 can be performed a multitude of times for each truck/trailer as well as for each cart associated with each truck. The steps depicted in FIG. 4 can also be performed in different orders than that depicted or in parallel with each other.

Figure 5:
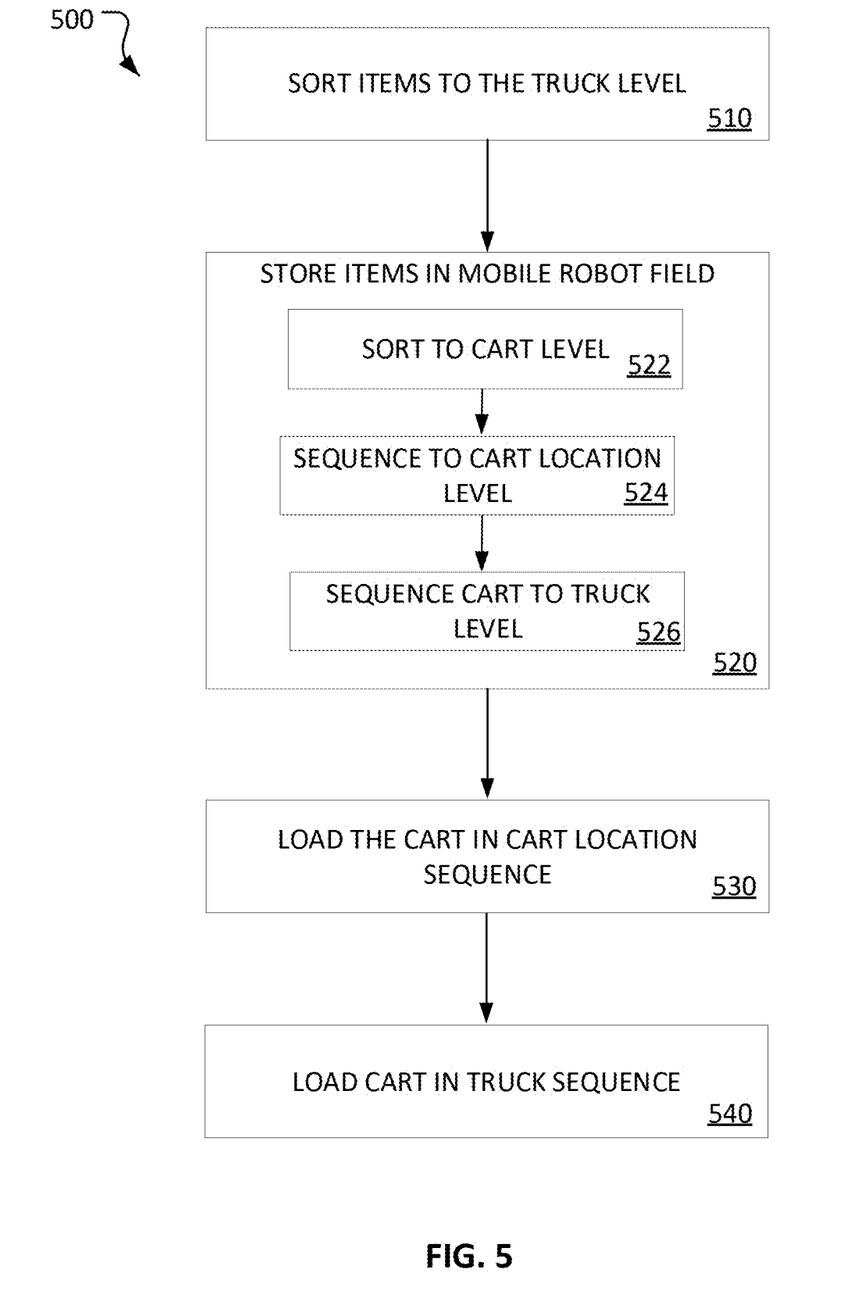
FIG. 5 is another flowchart of an example store replenishment cart level order sortation and sequencing system in accordance with some embodiments.

FIG. 5 is another flowchart of an example store replenishment cart level order sortation and sequencing process 500 in accordance with some embodiments. Process 500 is alternative flowchart depiction of the process 400 described in reference to FIG. 4. In the process 500, items are sorted to a truck-level in step 510 as previously described (refer to FIG. 4). Next, in step 520, the items are stored in a mobile robot field as previously described (refer to FIG. 4). While the items are stored in the mobile robot field, more granular sorts and sequences are performed.

First, in sub-step 522, the items are sorted to a cart level. As previously described throughout this disclosure, sorting to the cart level includes determining which items associated with a first truck should be sorted for transport on a first cart versus a second cart, etc. Each cart can be associated with an aisle in a store (or associated with another criteria for defining sub-sets of items).

Second, in sub-step 524, the items are sequenced to a cart location level. As previously described, sequencing to the cart location level includes determining a sequence for placing the items in the cart in a particular arrangement that matches the arrangement of the items in the shelving of a store. For example, if the store aisle will be stocked from a top shelf to a bottom shelf, the items that will be stocked on the bottom shelf can be placed at a bottom of the cart while the items that will be stocked on the top shelf can be placed at a top of the cart. Further, more granular sequencing can be performed, such that if the items will be stocked from left to right on each shelf from the top shelf to the bottom shelf, then the items can be placed in the cart such that the items that will be stocked first on the top shelf will be placed from left to right to match the way that the shelf will be stocked in the store.

Third, in sub-step 526, the cart is sequenced to a truck-level. As previously described, the control system described throughout this disclosure can be configured to assign a plurality of carts (e.g., aisle-ready carts, store-friendly transport vessels, etc.) to a particular truck or semi-trailer. In this step, the control system can determine a sequence for loading the plurality of carts into the particular semi-trailer based on the sequence that the plurality of carts will be used at a store to which the items are destined, and/or based on assigning each of the items to a particular location of a particular cart wherein the particular location assignments of the items are further based on how the items will be arranged at the store to which the items are destined. Moreover, the control system can determine a sequence for inducting the plurality of items into the mobile robot field based on the particular location assignments of the items in the particular cart and the sequence for loading the plurality of carts into the particular semi-trailer.

The sequence for loading the plurality of carts into the particular semi-trailer can correspond to the layout of a store. In one example, each cart can correspond to a store aisle. If a first aisle in the store is the last aisle to be stocked, the cart for replenishing the first aisle can be the last cart loaded into the truck/trailer. Consequently, items to be sorted and sequenced to the cart for the first aisle can be the last items moved from the mobile robot field to a loading station for sorting and sequencing to the cart. As previously discussed, sequencing a cart to a truck-level in subs-step 526 can be performed before any of the other sub-steps 522 and 524 and/or in parallel with these sub-steps.

In some embodiments, it may be preferred to sort the cart to the truck-level first before determining sorts to the cart level and sequencing to the cart location level. Performing the sequence to the truck-level first can be advantageous in situations where the warehouse does not want any filled carts temporarily taking up space in the warehouse while carts that should be loaded first into the truck are not yet being loaded. For example, once the cart is sorted to the truck-level, the control system can induct the plurality of items into the mobile robot field based on the sequence for loading the plurality of carts into the particular semi-trailer (e.g., truck) and a sequence that corresponds to the particular location assignments of the items in a particular cart. Sequencing to the truck-level first can also provide other advantages to the warehouse as discussed throughout this disclosure.

Once the granular sorts and sequences are determined in step 520, the control system can determine whether all of the items assigned to a first cart to be loaded into the particular semi-trailer or truck are in the mobile robot field. In response to determining that all of the items assigned to the first cart to be loaded into the particular semi-trailer are in the mobile robot field, the control system can cause one or more mobile robots to transport, from the mobile robot field to a station for loading by a robot or by a human operator the first cart, all of the items assigned to the first cart in the sequence that corresponds to the particular location assignments of the items in the first cart. In other words, the cart can be loaded in step 530 in the sequence as determined in sub-step 524 at the loading station (e.g., work station) discussed throughout this disclosure. In response to determining that all of the items assigned to the first cart are loaded into the first cart in the sequence that corresponds to the particular location assignments of the items, the first cart can be loaded in step 540 into the particular semi-trailer based on the sequence for loading the plurality of carts into the particular semi-trailer, as determined in sub-step 526.

Figure 6:
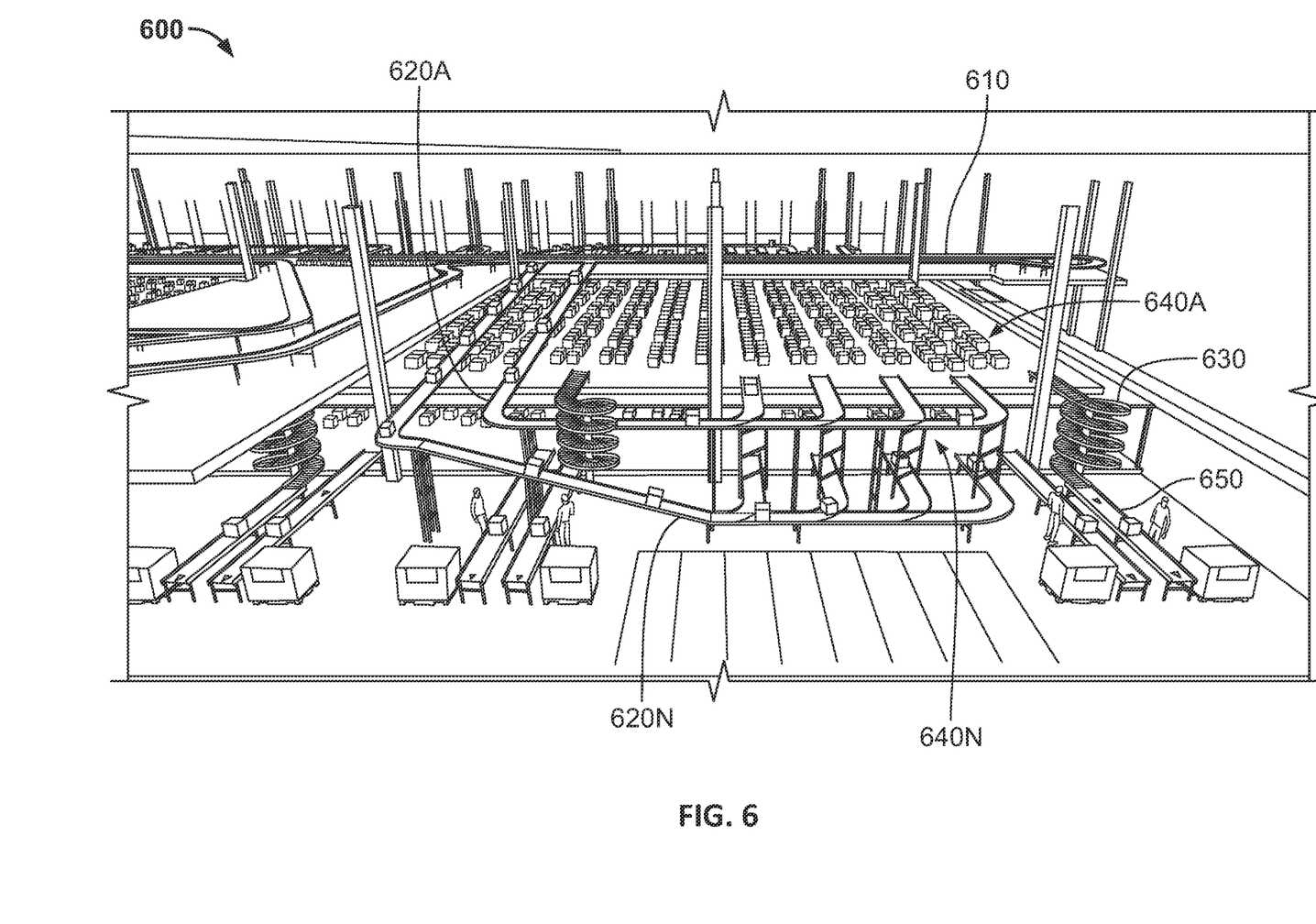
FIG. 6 depicts another example store replenishment cart level order sortation and sequencing system in accordance with some embodiments.

Moving onto the next figure, FIG. 6 depicts another example store replenishment cart level order sortation and sequencing system 600 in accordance with some embodiments described herein. The system 600 is variation of the system 300 as described in reference to FIG. 3. Referring to FIG. 6, the system 600 requires a smaller footprint in the warehouse facility because the mobile robot field is built up vertically such that it includes two or more levels. That is, the warehouse depicted in FIG. 6 comprises one or more multilevel mobile robot fields. In some embodiments, this multilevel system 600 can have more than two levels, depending on the needs, existing assets (e.g., sorting lanes, conveyors), and existing footprint of the warehouse facility.

In this example, a main conveyor 610 is elevated above both mobile robot field levels in the system 600. One or more sorting lanes (e.g., sorting lane 620A and sorting lane 620N) can branch off the main conveyor 610 and feed into one or more mobile robot fields (e.g., mobile robot field 640A and mobile robot field 640N). In this example, the sorting lane 620A feeds into the second level mobile robot field 640A. The sorting lane(s) can include a decline in elevation to feed into the mobile robot field(s).

In some embodiments, items can be transported from the upper level mobile robot field 640A to the floor level (e.g., to a workstation for loading a cart) on one or more spiral conveyors 630.

As described throughout this disclosure, a plurality of items can be inducted into the upper level mobile robot field 640A (e.g., a second elevated mobile robot field). The control system described throughout this disclosure can then determine whether all of the items assigned to a first cart (e.g., store-friendly transport vessel) are in the upper level mobile robot field 640A. In response to determining that all of the items assigned to the first cart are in the upper level mobile robot field 640A, the control system can cause one or more mobile robots to transport, from the upper level mobile robot field 640A to the spiral conveyor 630 associated with a station 650 for loading the first cart, all of the items assigned to the first cart in a sequence that corresponds to the particular location assignments of the items in the first cart (which in turn corresponds to a store shelf arrangement or other scheme).

In some embodiments, the control system previously described can determine that all items associated with a particular truck should be transported to and stored in a particular portion in a particular level mobile robot field. In other embodiments, all items associated with a particular cart of the particular truck can be transported to and stored in a same portion in a particular level mobile robot field. In yet other embodiments, it may be desirable to keep all the items associated with the particular truck in no particular portion in either level mobile robot field. Consequently, one or more robots can be configured by the control system to transport all of the items assigned to a first cart in a sequence that corresponds to the particular location assignments of the item which further comprises transporting all of the items assigned to the first cart from one or more elevated mobile robot fields to the station for loading (e.g., workstation, loading station).

In such situations, the order fulfillment control system can take into consideration different amounts of time that it would take to move items associated with the particular truck from an upper level mobile robot field to a loading station that will also receive items associated with the particular truck from a lower level mobile robot field. Seeing that this added time may decrease efficiency, this embodiment may be less desirable. Therefore, a preferred embodiment includes having all items associated with a particular truck or a particular cart associated with the particular truck in a same portion on a same level mobile robot field.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. An automated method for sorting saleable items into a store aisle-ready arrangement, the method comprising:
   inducting a plurality of items into a temporary storage area;
   assigning each of the items to a respective location of a first store-friendly transport vessel, wherein the respective location assignments of the items are based on how the items will be arranged at a store to which the items are destined;
   determining whether all of the items assigned to the first store-friendly transport vessel are in the temporary storage area; and
   in response to determining that all of the items assigned to the first store-friendly transport vessel are in the temporary storage area, transporting all of the items assigned to the first store-friendly transport vessel from the temporary storage area to a station for loading the first store-friendly transport vessel.

2. The method of claim 1, wherein the temporary storage area is a mobile robot field.

3. The method of claim 2, wherein the transporting is performed by one or more mobile robots.

4. The method of claim 2, wherein the transporting is performed in a sequence that corresponds to the respective location assignments of the items.

5. The method of claim 1, further comprising:
   assigning a plurality of store-friendly transport vessels to a particular semi-trailer; and
   determining a sequence for loading the plurality of store-friendly transport vessels into the particular semi-trailer based on how the plurality of items in the plurality of store-friendly transport vessels will be arranged at a store to which the items are destined.

6. The method of claim 1, wherein the plurality of items is inducted into the temporary storage area by a conveyor of the warehouse that is configured to feed into a particular portion of the temporary storage area.

7. The method of claim 1, wherein all of the items assigned to the first store-friendly transport vessel are located in a first portion of the temporary storage area and all of the items assigned to a second store-friendly transport vessel are located in a second portion of the temporary storage area that differs from the first portion of the temporary storage area.

8. The method of claim 1, further comprising:
determining whether all of the items assigned to a second store-friendly transport vessel are in the temporary storage area; and
in response to determining that all of the items assigned to the second store-friendly transport vessel are in the temporary storage area, transporting all of the items assigned to the second store-friendly transport vessel from the temporary storage area to a station for loading the second store-friendly transport vessel.

9. The method of claim 1, wherein the respective location assignments of the items are based on an order that one or more shelves in the store will be stocked.

10. The method of claim 9, wherein the respective location assignments of the items are based on at least one of a direction from left to right and a direction from right to left that the one or more shelves in the store aisle will be stocked.

11. The method of claim 1, wherein the temporary storage area comprises one or more multi-level mobile robot fields.

12. The method of claim 11, wherein the transporting comprises transporting all of the items assigned to the first store-friendly transport vessel from multiple levels of the one or more multi-level mobile robot fields to the station.

13. A system for sorting saleable items into a store aisle-ready arrangement, the system comprising:
a temporary storage area;
a conveyor of a warehouse that is configured to feed items into the temporary storage area; and
a control system configured to:
induct a plurality of items into the temporary storage area;
assigning each of the items to a respective location of a first store-friendly transport vessel, wherein the respective location assignments of the items are based on how the items will be arranged at a store to which the items are destined;
determining whether all of the items assigned to the first store-friendly transport vessel are in the temporary storage area; and
in response to determining that all of the items assigned to the first store-friendly transport vessel are in the temporary storage area, transporting all of the items assigned to the first store-friendly transport vessel from the temporary storage area to a station for loading the first store-friendly transport vessel.

14. The system of claim 13, wherein the temporary storage area is a first mobile robot field.

15. The system of claim 14, wherein the first mobile robot field comprises two or more portions.

16. The system of claim 15, wherein a mobile robot is assigned to a particular portion of the first mobile robot field.

17. The system of claim 14, wherein the first mobile robot field is a multilevel robot field.

18. An automated method for sorting saleable items into a store aisle-ready arrangement, the method comprising:
inducting a plurality of items into a temporary storage area;
determining whether all of the items assigned to a first store-friendly transport vessel are in the temporary storage area; and
in response to determining that all of the items assigned to the first store-friendly transport vessel are in the first mobile robot field, transporting all of the items assigned to the first store-friendly transport vessel in a sequence that corresponds to assigned locations of the items in the first store-friendly transport vessel.

19. The method of claim 18, wherein the temporary storage area comprises a mobile robot field.

20. The method of claim 19, wherein the transporting is performed by one or more mobile robots.

* * * * *